(12) United States Patent
Liu (10) Patent No.: US 8,837,038 B2
(45) Date of Patent: Sep. 16, 2014

(54) FIBER GEOMETRICAL MANAGEMENT FOR TEM00 MODE PULSE ENERGY SCALING OF FIBER LASERS AND AMPLIFIERS

(75) Inventor: Jian Liu, Sunnyvale, CA (US)

(73) Assignee: PolarOnyx, Inc., San Jose, CA (US)

( * ) Notice: Subject to any disclaimer, the term of this patent is extended or adjusted under 35 U.S.C. 154(b) by 133 days.

(21) Appl. No.: 13/615,472

(22) Filed: Sep. 13, 2012

(65) Prior Publication Data

US 2014/0071521 A1    Mar. 13, 2014

(51) Int. Cl.
*H01S 3/067* (2006.01)
*G02B 6/024* (2006.01)
*G02B 6/122* (2006.01)
*G02B 6/12* (2006.01)

(52) U.S. Cl.
CPC ............ *H01S 3/06729* (2013.01); *G02B 5/024* (2013.01); *G02B 6/1228* (2013.01); *H01S 3/06745* (2013.01); *C03B 2203/302* (2013.01); *G02B 2006/12038* (2013.01); *H01S 3/06754* (2013.01)
USPC ............................ 359/341.1; 385/43; 385/123

(58) Field of Classification Search
CPC .................... G02B 6/1228; G02B 2006/12038; G02B 6/024; H01S 3/06754; H01S 3/06729; G02F 1/0115; C03B 2203/302
See application file for complete search history.

(56) References Cited

U.S. PATENT DOCUMENTS

| | | | | |
|---|---|---|---|---|
| 5,745,284 A * | 4/1998 | Goldberg et al. | ............. | 359/344 |
| 5,818,630 A * | 10/1998 | Fermann et al. | ......... | 359/341.31 |
| 6,324,326 B1 * | 11/2001 | Dejneka et al. | ............... | 385/123 |
| 6,987,783 B2 * | 1/2006 | Fajardo et al. | .................... | 372/6 |
| 7,256,930 B2 * | 8/2007 | Liu | ............................ | 359/337.1 |
| 7,440,173 B2 * | 10/2008 | Liu et al. | .................... | 359/337.5 |
| 2007/0002910 A1 * | 1/2007 | Liu et al. | .......................... | 372/25 |
| 2008/0240663 A1 * | 10/2008 | Dong et al. | .................... | 385/125 |
| 2012/0027031 A1 * | 2/2012 | Liu | ................... | 372/6 |
| 2012/0219026 A1 * | 8/2012 | Saracco et al. | .................. | 372/21 |

OTHER PUBLICATIONS

P.K. Choudhury, Deepak Kumar, Towards dispersion relations for tapered core dielectric elliptical fibers, Optik—International Journal for Light and Electron Optics, vol. 118, Issue 7, Jul. 6, 2007, pp. 340-344, ISSN 0030-4026, http://dx.doi.org/10.1016/j.ijleo.2006.04.001.*

* cited by examiner

*Primary Examiner* — Ari M Diacou
(74) *Attorney, Agent, or Firm* — Taboada Law Firm, PLLC; John M. Taboada (57) ABSTRACT

Methods and systems for managing pulse energy scaling are disclosed, including generating electromagnetic radiation; coupling the electromagnetic radiation to a fiber geometrical management system comprising: a tapered fiber comprising: an elliptical or rectangular core centrally positioned within a single or double cladding shell, wherein the core comprises a fiber material and a doped gain medium; an input face wherein the doped core comprises a major axis and a minor axis, wherein the ratio of the major to minor axis at the input face ranges from about 1 to about 100; an output face wherein the doped core comprises a major axis and a minor axis, wherein the ratio of the major to minor axis at the output face ranges from about 1 to about 100; and wherein the major (minor) axis is adiabatically or linearly tapered from the input face to the output face. Other embodiments are described and claimed.

24 Claims, 7 Drawing Sheets

FIBER GEOMETRICAL MANAGEMENT FOR TEM00 MODE PULSE ENERGY SCALING OF FIBER LASERS AND AMPLIFIERS

I. BACKGROUND

The invention relates generally to the field of pulse energy scaling of fiber lasers and amplifiers. More particularly, the invention relates to a method and apparatus for geometrical fiber management for TEM00 mode pulse energy scaling of fiber lasers and amplifiers.

II. SUMMARY

In one respect, disclosed is a fiber geometrical management system for TEM00 pulse energy scaling comprising: a tapered fiber comprising: an elliptical core centrally positioned within a single cladding or double cladding shell, wherein the elliptical core comprises a fiber material and a doped gain medium; an input face wherein the doped elliptical core comprises a first major axis and a first minor axis, wherein the ratio of the first major axis to the first minor axis of the doped elliptical core at the input face ranges from about 1 to about 100; an output face wherein the doped elliptical core comprises a second major axis and a second minor axis, wherein the ratio of the second major axis to the second minor axis of the doped elliptical core at the output face ranges from about 1 to about 100; and wherein the first major and minor axis is adiabatically or linearly tapered to the second major and minor axis. The ratio of second major (minor) axis to the first major (minor) axis ranges from 1 to 100.

In another respect, disclosed is a fiber geometrical management system for TEM00 pulse energy scaling comprising: a tapered fiber comprising: a rectangular core centrally positioned within a single cladding or double cladding shell, wherein the rectangular core comprises a fiber material and a doped gain medium; an input face wherein the doped rectangular core comprises a first major axis and a first minor axis, wherein the ratio of the first major axis to the first minor axis of the doped rectangular core at the input face ranges from about 1 to about 100; an output face wherein the doped rectangular core comprises a second major axis and a second minor axis, wherein the ratio of the second major axis to the second minor axis of the doped rectangular core at the output face ranges from about 1 to about 100; and wherein the first major and minor axis is adiabatically or linearly tapered to the second major and minor axis. The ratio of second major (minor) axis to the first major (minor) axis ranges from 1 to 100.

In another respect, disclosed is a method for managing TEM00 pulse energy scaling comprising: generating electromagnetic radiation from a signal laser; coupling the electromagnetic radiation from the signal laser to a fiber geometrical management system comprising: a tapered fiber comprising: an elliptical core centrally positioned within a single cladding or double cladding shell, wherein the elliptical core comprises a fiber material and a doped gain medium; an input face wherein the doped elliptical core comprises a first major axis and a first minor axis, wherein the ratio of the first major axis to the first minor axis of the doped elliptical core at the input face ranges from about 1 to about 100; an output face wherein the doped elliptical core comprises a second major axis and a second minor axis, wherein the ratio of the second major (minor) axis to the second major (minor) axis of the doped elliptical core at the output face ranges from about 1 to about 100; and wherein the first major (minor) axis is adiabatically or linearly tapered to the second major (minor) axis; amplifying the electromagnetic radiation from the signal laser within the fiber geometrical management system by a pump laser; and coupling the amplified signal laser electromagnetic radiation out of the fiber geometrical management system. The ratio of second major (minor) axis to the first major (minor) axis ranges from 1 to 100.

In another respect, disclosed is a method for managing TEM00 pulse energy scaling comprising: generating electromagnetic radiation from a signal laser; coupling the electromagnetic radiation from the signal laser to a fiber geometrical management system comprising: a tapered fiber comprising: a rectangular core centrally positioned within a single cladding or double cladding shell, wherein the rectangular core comprises a fiber material and a doped gain medium; an input face wherein the doped rectangular core comprises a first major axis and a first minor axis, wherein the ratio of the first major axis to the first minor axis of the doped rectangular core at the input face ranges from about 1 to about 100; an output face wherein the doped rectangular core comprises a second major axis and a second minor axis, wherein the ratio of the second major axis to the second minor axis of the doped rectangular core at the output face ranges from about 1 to about 100; and wherein the first major (minor) axis is adiabatically or linearly tapered to the second major (minor) axis; amplifying the electromagnetic radiation from the signal laser within the fiber geometrical management system by a pump laser; and coupling the amplified signal laser electromagnetic radiation out of the fiber geometrical management system. The ratio of second major (minor) axis to the first major (minor) axis ranges from 1 to 100.

Numerous additional embodiments are also possible.

III. BRIEF DESCRIPTION OF THE DRAWINGS

Other objects and advantages of the invention may become apparent upon reading the detailed description and upon reference to the accompanying drawings.

While the invention is subject to various modifications and alternative forms, specific embodiments thereof are shown by way of example in the drawings and the accompanying detailed description. It should be understood, however, that the drawings and detailed description are not intended to limit the invention to the particular embodiments. This disclosure is instead intended to cover all modifications, equivalents, and alternatives falling within the scope of the present invention as defined by the appended claims.

IV. DETAILED DESCRIPTION

One or more embodiments of the invention are described below. It should be noted that these and any other embodiments are exemplary and are intended to be illustrative of the invention rather than limiting. While the invention is widely applicable to different types of systems, it is impossible to include all of the possible embodiments and contexts of the invention in this disclosure. Upon reading this disclosure, many alternative embodiments of the present invention will be apparent to persons of ordinary skill in the art.

Fiber lasers have evolved into a new era of applications. More and more, these new applications are requiring higher pulse energy and power. The challenge has become how to handle the ever increasing pulse energy output from the fiber while still maintaining a good, diffraction limited beam quality. Unfortunately, conventional fiber approaches which use large mode area (LMA) fiber or photonic crystal fiber (PCF) have limitations which limit their use in further scaling the pulse energy output from the fiber.

Pulse energy scaling is not the only challenge to current fiber design. Maintaining polarization mode propagation is an additional consideration for the pulse energy scaling of fiber laser and amplifiers. For example, in a PANDA type fiber which maintains polarization by inducing a stress in the core by embedding stress rods or members within the cladding, when the fiber core size increases with reduced numerical aperture (NA), the stress rods or members of the PANDA type fiber tend to be weak in keeping the polarization maintained along a long piece of LMA fiber.

The methods and apparatuses of the invention described herein may solve these shortcomings as well as others by proposing a novel fiber design which is capable of pulse energy scaling while also maintaining a TEM00 mode quality and/or polarization.

In circularly symmetric waveguides, such as in the core of a fiber, the slightest asymmetry can cause dramatic changes in the form of the modal fields. The circular modes couple power between themselves. This is more important for LMA fiber. So, in LMA fiber, a tension or bending is applied to strip high order modes. The tension or bending causes an asymmetrical refractive index profile which results in a higher loss of the high order modes. When the asymmetry has a preferred axis, the fundamental mode becomes stable. The polarization can also be maintained.

Figure 1:
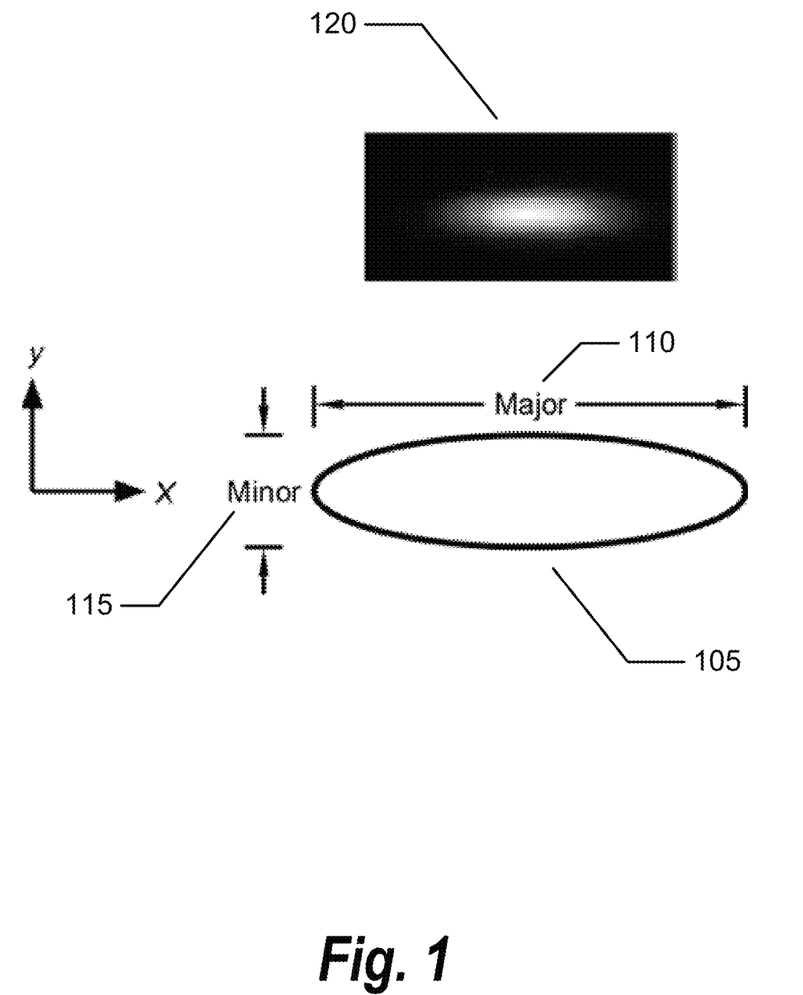
FIG. 1 is a schematic illustration of the cross-section of an elliptical core along with its corresponding mode profile, in accordance with some embodiments.

FIG. 1 is a schematic illustration of the cross-section of an elliptical core along with its corresponding mode profile, in accordance with some embodiments.

In some embodiments, an elliptical core is used to expand the beam size or mode field diameter (MFD) in one direction while maintaining a regular size in the other direction. FIG. 1 illustrates the fiber core geometry for an elliptical core 105 referenced with an x-y axis. In the elliptical core 105, the major axis 110 is shown aligned with the x-axis and the minor axis 115 is shown aligned with the y-axis. The elliptical core's minor axis 115 can range in size from about 10 µm to about 100 µm. The ratio between the major axis to minor axis can range between 1 to 100. The elliptical core design results in an elliptical beam profile shape 120, which is capable of extracting more pulse energy out of the fiber than circular shaped fiber cores. Additionally, the elliptical core design can handle much higher peak powers than circular shaped fiber cores. Moreover, due to the confinement in the y-direction, it is not as challenging to make the x-direction expansion of the beam profile single mode. The shape induced stress from the elliptical shaped core, makes the fiber behave as a polarization maintaining fiber with its fast axis along the minor axis 115 and the slow axis along the major axis 110. This eccentricity is necessary in order for the TEM00 mode to be stable within an elliptical core.

Figure 2:
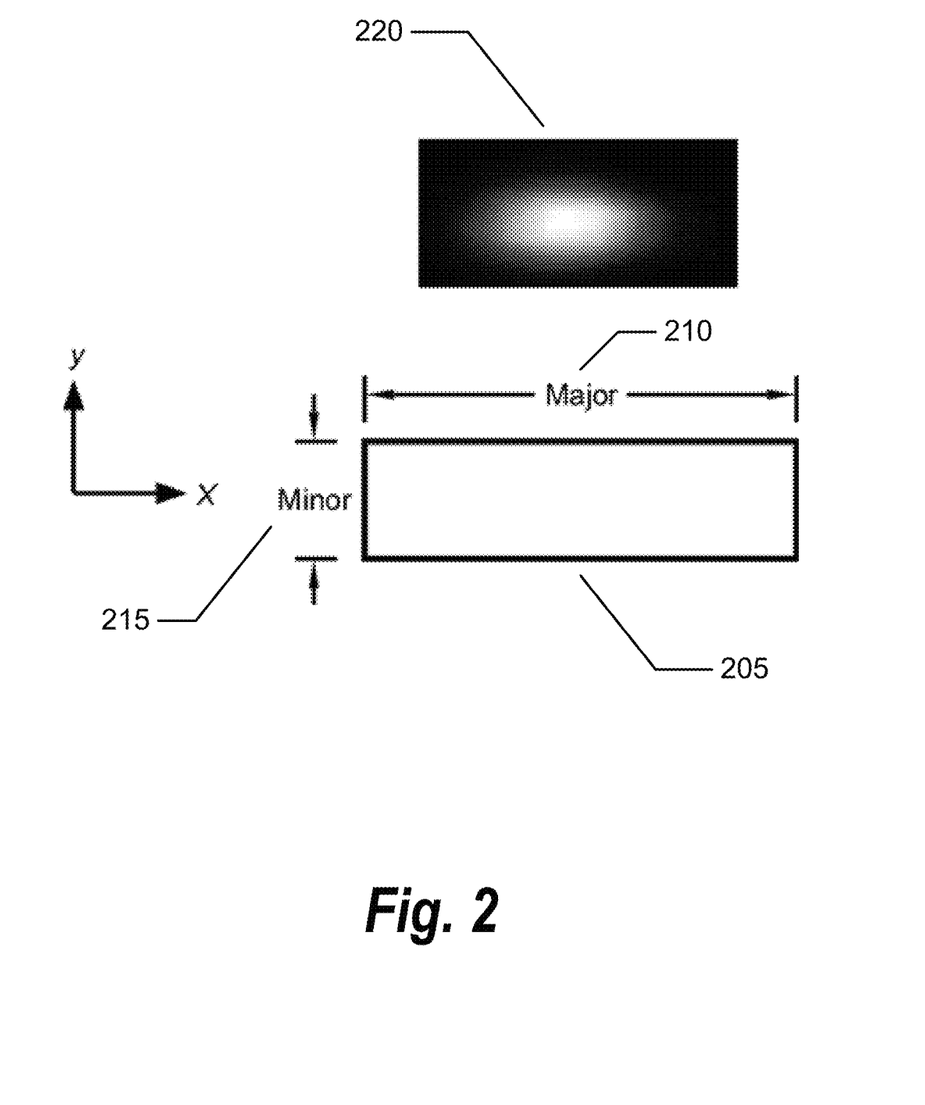
FIG. 2 is a schematic illustration of the cross-section of a rectangular core along with its corresponding mode profile, in accordance with some embodiments.

FIG. 2 is a schematic illustration of the cross-section of a rectangular core along with its corresponding mode profile, in accordance with some embodiments.

In some embodiments, a rectangular core is used to expand the beam size or mode field diameter (MFD) in one direction while maintaining a regular size in the other direction. FIG. 2 illustrates the fiber core geometry for a rectangular core 205 referenced with an x-y axis. In the rectangular core 205, the major axis 210 is shown aligned with the x-axis and the minor axis 215 is shown aligned with the y-axis. The rectangular core's minor axis 215 can range in size from about 10 µm to about 100 µm. The ratio between the major axis to minor axis can range between 1 to 100. The rectangular core design results in an elliptical beam profile shape 220, which is capable of extracting more pulse energy out of the fiber than circular shaped fiber cores. Additionally, the rectangular core design can handle much higher peak powers than circular shaped fiber cores. Moreover, due to the confinement in the y-direction, it is not as challenging to make the x-direction expansion of the beam profile single mode. The shape induced stress from the rectangular shaped core, makes the fiber behave as a polarization maintaining fiber with its fast axis along the minor axis 215 and the slow axis along the major axis 210.

Figure 3:
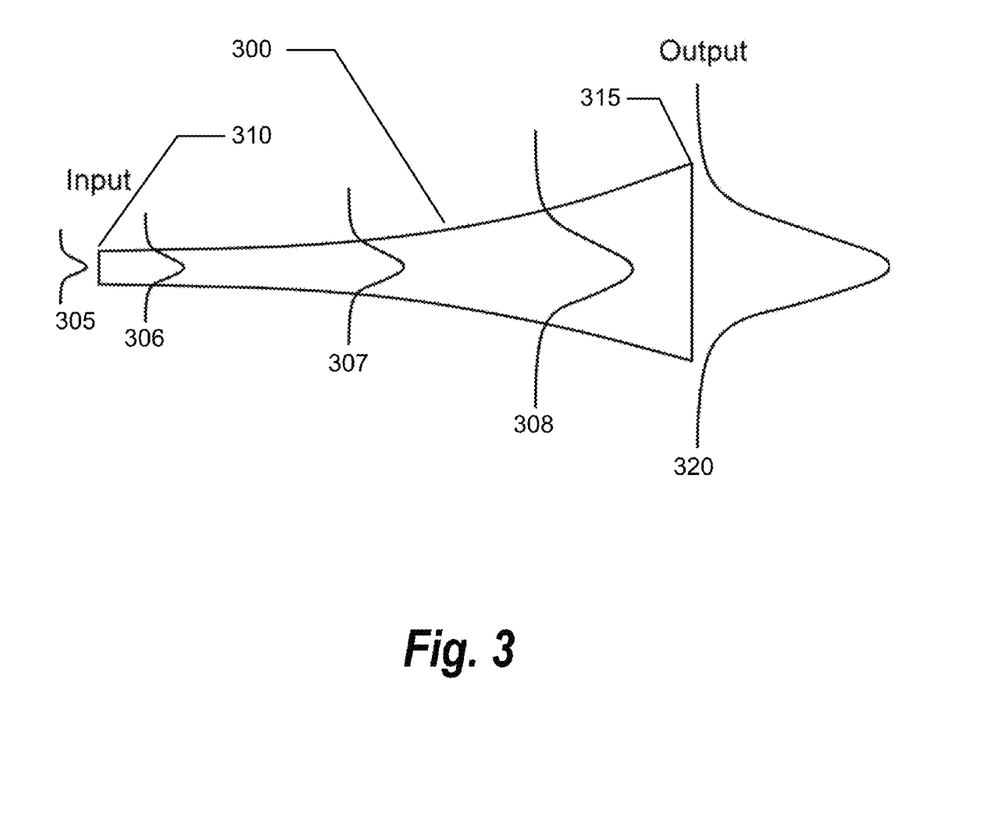
FIG. 3 is a side view schematic illustration of the doped taper fiber amplifying a signal as it propagates through the doped tapered fiber, in accordance with some embodiments.

FIG. 3 is a side view schematic illustration of the doped taper fiber amplifying a signal as it propagates through the doped tapered fiber, in accordance with some embodiments.

In some embodiments, an input signal 305, such as electromagnetic radiation from a signal laser, is coupled at the input 310 of a doped tapered fiber 300. The signal propagates through the doped tapered fiber, 306, 307, 308, where it ultimately exits at the output 315 as an amplified signal 320. The signal is amplified by the pumping of the gain medium of the doped tapered fiber by the pump wavelength of the dopant. The major (minor) axis of the doped tapered fiber is adiabatically tapered from 10 µm to 100 µm in order to handle the increasing pulse energy of the signal. In other embodiments, the doped tapered fiber may have a linear taper. The taper of the fiber is controlled during the drawing of the fiber by increasing the draw speed to decrease the core size. Conversely, slowing the draw speed results in an increased core. Both methods of fiber drawing are possible, but typically the draw speed is increased in order to decrease the core size. In order to reduce the nonlinear impact, stimulated Brillouin scattering, stimulated Raman scattering, and/or self phase modulation, of the amplified signal as it propagates through the fiber gain medium, both the size of the core and the cladding are tapered. Any number of rare earth dopants may be used to increase the gain coefficient of the tapered fiber, such as Erbium (Er), Ytterbium (Yb), Thulium (Tm), Holmium (Ho), Er/Yb, Er:ZBLAN, Tm:ZBLAN, Ho:ZBLAN, or a combination of two or more ions. The fiber material may be silica, Germanium, Fluoride, Chalcogenide, ZBLAN, or a combination of two or more types of materials. Additionally the doped taper fiber may be either single cladding pumped by a single mode pump or double cladding pumped by a multimode pump. Depending on the selection of the core geometry, the doped taper fiber may be either polarization maintaining or non-polarization maintaining. The doped taper fiber may be used with CW or pulsed fiber lasers, such as ns fiber lasers and ultrafast ps and fs chirped fiber amplifiers, with wavelengths from 0.7 μm to 5.0 μm. The embodied doped tapered fiber features high efficiency, inherent with fiber lasers, and minimal nonlinear effects.

Figure 4:
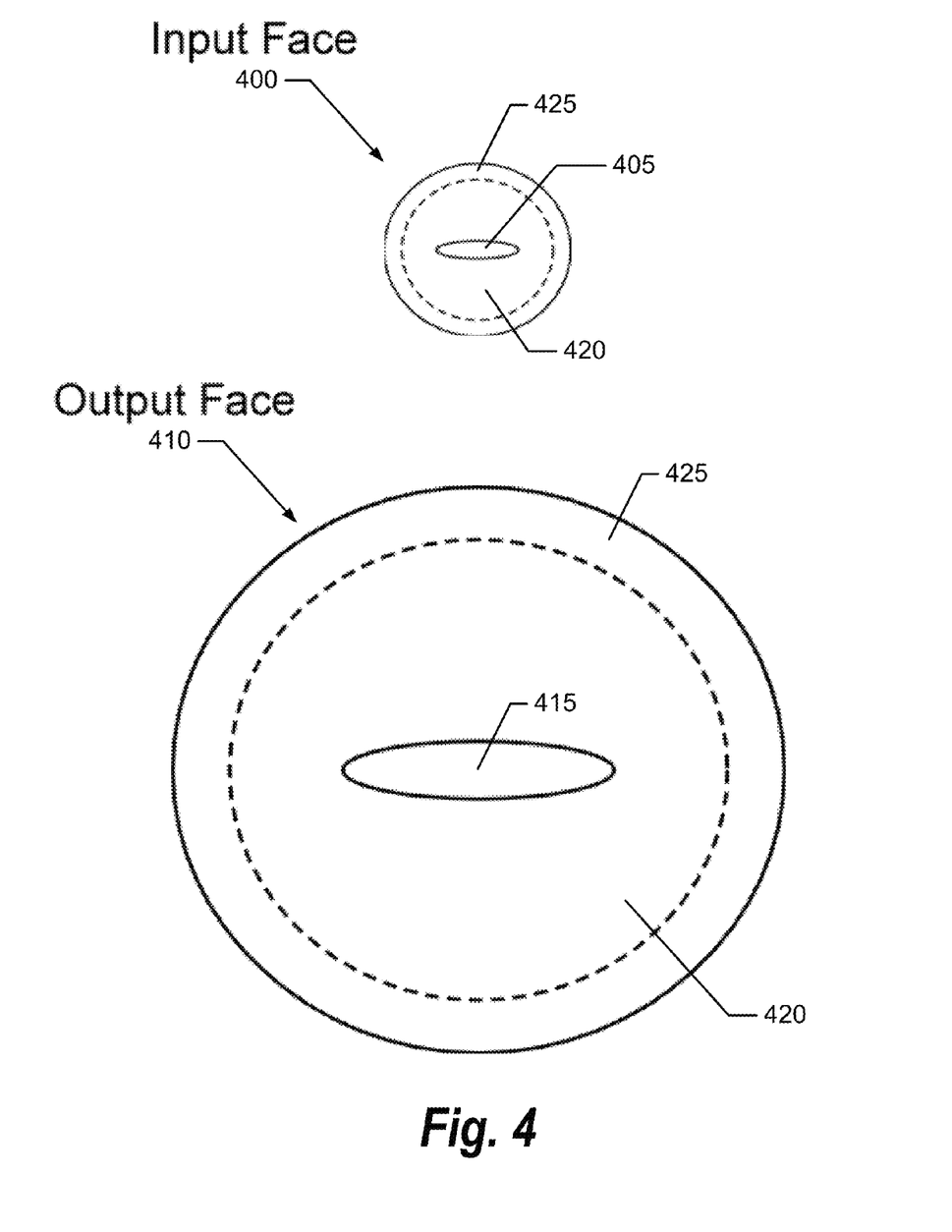
FIG. 4 is a cross section schematic illustration of an elliptical core doped tapered fiber input face and output face, in accordance with some embodiments.

FIG. 4 is a cross section schematic illustration of an elliptical core doped tapered fiber input face and output face, in accordance with some embodiments.

In some embodiments, the input face 400 of the doped tapered fiber has an elliptical core 405 with a minor axis dimension of 10 μm. The ratio of the major axis to minor axis at the input face can range from 1 to 100. When the ratio is one, the elliptical core is actually just a circular core since the major and minor axes are equal. The input core may be circular in some embodiments. At the output face 410, the doped tapered fiber has an elliptical core 415 with a minor axis dimension of 100 μm. The ratio of the major axis to minor axis at the output face can also range from 1 to 100. It is possible to have both a circular input core and circular output core, but in such an embodiment, the doped tapered fiber will not be polarizing maintaining. Any combination of circular and elliptical input core and output core designs may be used, but in order to operate easily in single mode, the output core should be elliptical. The embodiment illustrated in FIG. 4 shows both an inner cladding 420 and an outer cladding 425, but a single cladding fiber may be alternatively used.

Figure 5:
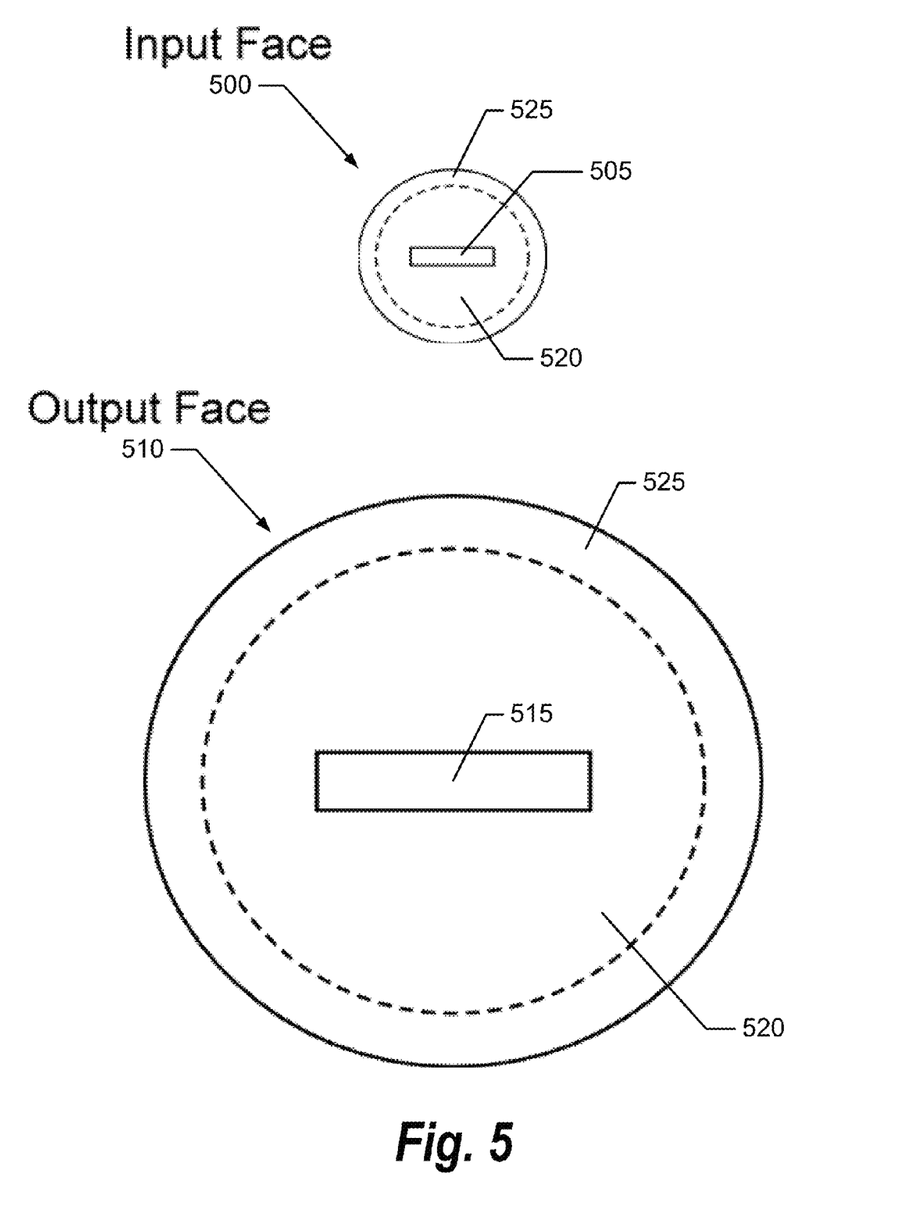
FIG. 5 is a cross section schematic illustration of a rectangular core doped tapered fiber input face and output face, in accordance with some embodiments.

FIG. 5 is a cross section schematic illustration of a rectangular core doped tapered fiber input face and output face, in accordance with some embodiments.

In some embodiments, the input face 500 of the doped tapered fiber has a rectangular core 505 with a minor axis dimension of 10 μm. The ratio of the major axis to minor axis at the input face can range from 1 to 100. When the ratio is one, the rectangular core is actually just a square core since the major and minor axes are equal. The input core may be square in some embodiments. At the output face 510, the doped tapered fiber has a rectangular core 515 with a minor axis dimension of 100 μm. The ratio of the major axis to minor axis at the output face can also range from 1 to 100. It is possible to have both a square input core and square output core, but in such an embodiment, the doped tapered fiber will not be polarizing maintaining. Any combination of square and rectangular input core and output core designs may be used, but in order to operate easily in single mode, the output core should be rectangular. The embodiment illustrated in FIG. 5 shows both an inner cladding 520 and an outer cladding 525, but a single cladding fiber may be alternatively used.

Figure 6A:
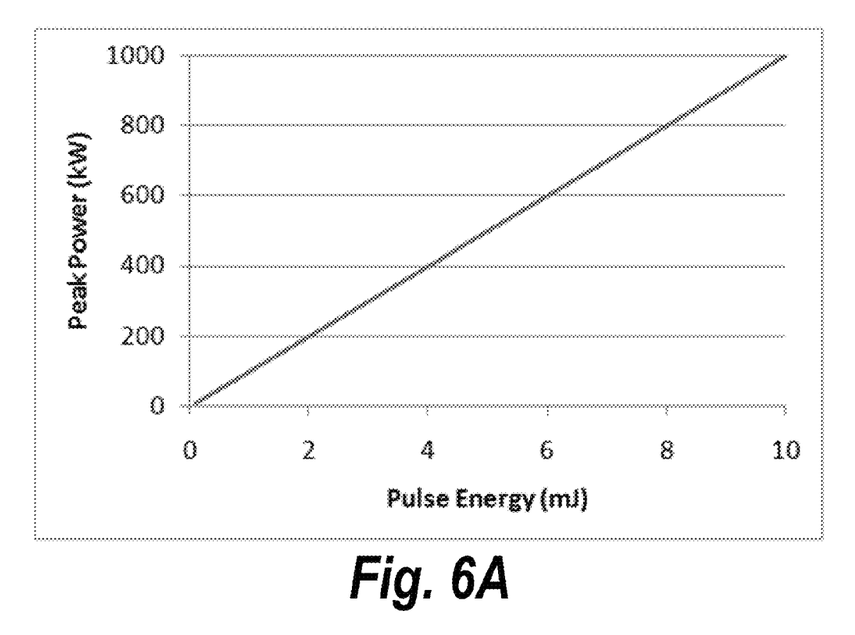
FIGS. 6A and 6B are graphs showing the simulation of the peak power evolution in the doped tapered fiber and the core size as a function of pulse energy, in accordance with some embodiments.
Figure 6B:
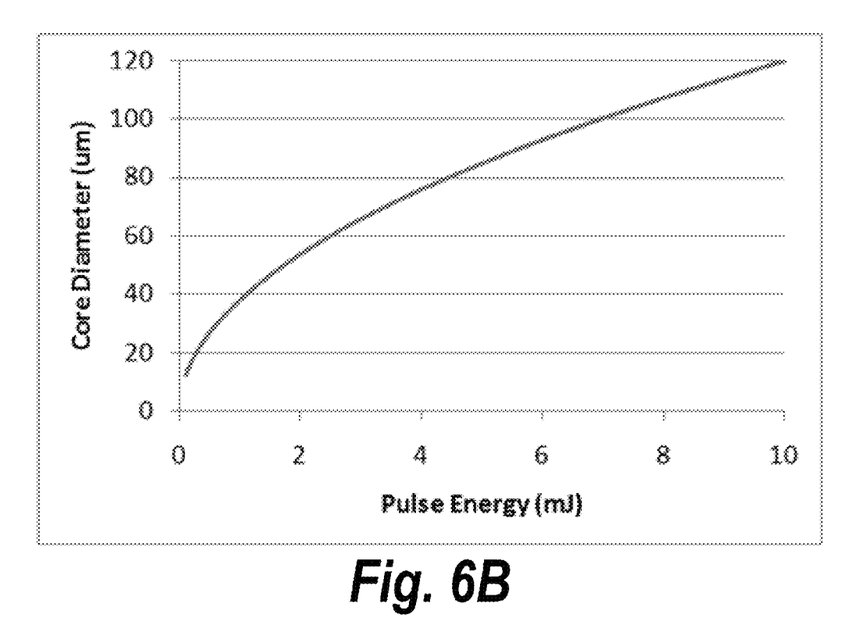

FIGS. 6A and 6B are graphs showing the simulation of the peak power evolution in the doped tapered fiber and the core size as a function of pulse energy, in accordance with some embodiments.

In some embodiments, the doped tapered fiber core designs of FIG. 4 and FIG. 5 may be used to handle high peak powers that evolve in a high pulse energy fiber amplifier. FIG. 6A shows a simulation of one such peak power as a function of pulse pulse energy. For a pulse energy amplified to 10 mJ, 1 MW will be reached at a pulse width of 10 ns. It is not possible for a conventional LMA fiber to handle such a high peak power. Additionally, using multi-mode fiber sacrifices beam quality. FIG. 6B shows a simulation of the required core size as a function of pulse energy in order to resolve the peak power handling issue in scaling the high pulse energy of the fiber amplifier. By adiabatically tapering the fiber core size from 5-40 μm to 40-200 μm, the pulse can be gradually amplified to over 10 mJ and the beam quality can be maintained without degradation. With a further increase of the output core size of the fiber, higher energies may be achieved for single mode operation.

Figure 7:
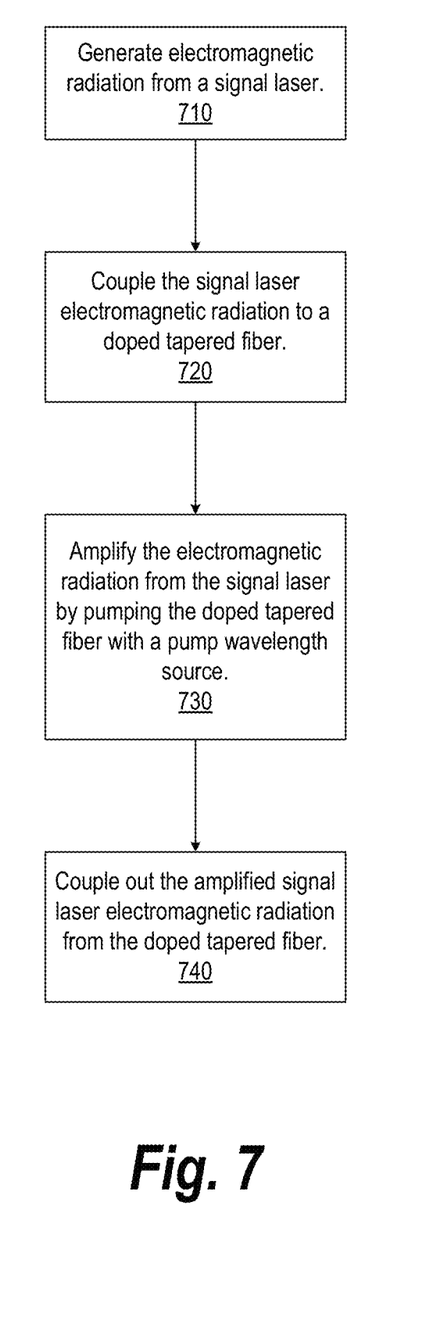
FIG. 7 is a block diagram illustrating a method for managing pulse energy scaling of fiber lasers and amplifiers, in accordance with some embodiments.

FIG. 7 is a block diagram illustrating a method for managing pulse energy scaling of fiber lasers and amplifiers, in accordance with some embodiments.

In some embodiments, a signal laser is used to generate electromagnetic radiation 710. The signal laser electromagnetic radiation is then coupled to a doped tapered fiber 720. Within the doped taped fiber, the signal laser electromagnetic radiation is amplified by a pump wavelength source 730 or laser. The amplified signal laser electromagnetic radiation is then coupled out of the doped tapered fiber 740.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The benefits and advantages that may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

The invention claimed is:

1. A fiber geometrical management system for TEM00 pulse energy scaling comprising:
    a tapered fiber comprising:
        an elliptical core centrally positioned within a single cladding or double cladding shell, wherein the elliptical core comprises a fiber material and a doped gain medium;
        an input face wherein the doped elliptical core comprises a first major axis and a first minor axis, wherein the ratio of the first major axis to the first minor axis of the doped elliptical core at the input face ranges from about 1 to about 100; and
        an output face wherein the doped elliptical core comprises a second major axis and a second minor axis, wherein the ratio of the second major axis to the second minor axis of the doped elliptical core at the output face ranges from about 1 to about 100;
        wherein the first minor axis of the doped elliptical core at the input face is adiabatically or linearly tapered to the second minor axis of the doped elliptical core at the output face;

wherein the first major axis of the doped elliptical core at the input face is adiabatically or linearly tapered to the second major axis of the doped elliptical core at the output face;

wherein the doped gain medium of the elliptical core extends from the input face to the output face; and wherein the tapered fiber is polarization maintaining.

2. The fiber geometrical management system of claim 1, wherein the single cladding or double cladding shell is adiabatically or linearly tapered from the input face to the output face.

3. The fiber geometrical management system of claim 1, wherein the first minor axis of the doped elliptical core at the input face ranges from about 5 μm to 40 μm and wherein the second minor axis of the doped elliptical core at the output face ranges from about 40 μm to 200 μm.

4. The fiber geometrical management system of claim 1, wherein the doped gain medium is selected from: Er, Yb, Tm, Ho, Er/Yb, Er:ZBLAN, Ho:ZBLAN, and Tm:ZBLAN.

5. The fiber geometrical management system of claim 1, wherein the fiber material comprises at least one of: silica, Germanium doped silica, Fluoride doped silica, Chalcogenide, and ZBLAN.

6. The fiber geometrical management system of claim 1, wherein the tapered fiber operates in a wavelength range from about 0.7 μm to about 5.0 μm.

7. A method for managing TEM00 pulse energy scaling comprising:

generating electromagnetic radiation from a signal laser;

coupling the electromagnetic radiation from the signal laser to a fiber geometrical management system comprising:

a tapered fiber comprising:

an elliptical core centrally positioned within a single cladding or double cladding shell, wherein the elliptical core comprises a fiber material and a doped gain medium;

an input face wherein the doped elliptical core comprises a first major axis and a first minor axis, wherein the ratio of the first major axis to the first minor axis of the doped elliptical core at the input face ranges from about 1 to about 100; and an output face wherein the doped elliptical core comprises a second major axis and a second minor axis, wherein the ratio of the second major axis to the second minor axis of the doped elliptical core at the output face ranges from about 1 to about 100;

wherein the first minor axis of the doped elliptical core at the input face is adiabatically or linearly tapered to the second minor axis of the doped elliptical core at the output face;

wherein the first major axis of the doped elliptical core at the input face is adiabatically or linearly tapered to the second major axis of the doped elliptical core at the output face;

wherein the doped gain medium of the elliptical core extends from the input face to the output face; and wherein the tapered fiber is polarization maintaining;

amplifying the electromagnetic radiation from the signal laser within the fiber geometrical management system by a pump laser; and coupling the amplified signal laser electromagnetic radiation out of the fiber geometrical management system.

8. The method for managing TEM00 pulse energy scaling of claim 7, wherein the single cladding or double cladding shell is adiabatically or linearly tapered from the input face to the output face.

9. The method for managing TEM00 pulse energy scaling of claim 7, wherein the first minor axis of the doped elliptical core at the input face ranges from about 5 μm to 40 μm and wherein the second minor axis of the doped elliptical core at the output face ranges from about 40 μm to 200 μm.

10. The method for managing TEM00 pulse energy scaling of claim 7, wherein the doped gain medium is selected from: Er, Yb, Tm, Ho, Er/Yb, Er:ZBLAN, Ho:ZBLAN, and Tm:ZBLAN.

11. The method for managing TEM00 pulse energy scaling of claim 7, wherein the fiber material comprises at least one of: silica, Germanium doped silica, Fluoride doped silica, Chalcogenide, and ZBLAN.

12. The method for managing TEM00 pulse energy scaling of claim 7, wherein the tapered fiber operates in a wavelength range from about 0.7 μm to about 5.0 μm.

13. A fiber geometrical management system for TEM00 pulse energy scaling comprising:

a tapered fiber comprising:

a rectangular core centrally positioned within a single cladding or double cladding shell, wherein the rectangular core comprises a fiber material and a doped gain medium;

an input face wherein the doped rectangular core comprises a first major axis and a first minor axis, wherein the ratio of the first major axis to the first minor axis of the doped rectangular core at the input face ranges from about 1 to about 100; and an output face wherein the doped rectangular core comprises a second major axis and a second minor axis, wherein the ratio of the second major axis to the second minor axis of the doped rectangular core at the output face ranges from about 1 to about 100;

wherein the first minor axis of the doped rectangular core at the input face is adiabatically or linearly tapered to the second minor axis of the doped rectangular core at the output face;

wherein the first major axis of the doped rectangular core at the input face is adiabatically or linearly tapered to the second major axis of the doped rectangular core at the output face;

wherein the doped gain medium of the rectangular core extends from the input face to the output face; and wherein the tapered fiber is polarization maintaining.

14. The fiber geometrical management system of claim 13, wherein the single cladding or double cladding shell is adiabatically or linearly tapered from the input face to the output face.

15. The fiber geometrical management system of claim 13, wherein the first minor axis of the doped rectangular core at the input face ranges from about 5 μm to 40 μm and wherein the second minor axis of the doped rectangular core at the output face ranges from about 40 μm to 200 μm.

16. The fiber geometrical management system of claim 13, wherein the doped gain medium is selected from: Er, Yb, Tm, Ho, Er/Yb, Er:ZBLAN, Ho:ZBLAN, and Tm:ZBLAN.

17. The fiber geometrical management system of claim 13, wherein the fiber material comprises at least one of: silica, Germanium doped silica, Fluoride doped silica, Chalcogenide, and ZBLAN.

18. The fiber geometrical management system of claim 13, wherein the tapered fiber operates in a wavelength range from about 0.7 μm to about 5.0 μm.

19. A method for managing TEM00 pulse energy scaling comprising:

generating electromagnetic radiation from a signal laser;

coupling the electromagnetic radiation from the signal laser to a fiber geometrical management system comprising:
a tapered fiber comprising:
a rectangular core centrally positioned within a single cladding or double cladding shell, wherein the rectangular core comprises a fiber material and a doped gain medium;
an input face wherein the doped rectangular core comprises a first major axis and a first minor axis, wherein the ratio of the first major axis to the first minor axis of the doped rectangular core at the input face ranges from about 1 to about 100; and
an output face wherein the doped rectangular core comprises a second major axis and a second minor axis, wherein the ratio of the second major axis to the second minor axis of the doped rectangular core at the output face ranges from about 1 to about 100;
wherein the first minor axis of the doped rectangular core at the input face is adiabatically or linearly tapered to the second minor axis of the doped rectangular core at the output face;
wherein the first major axis of the doped rectangular core at the input face is adiabatically or linearly tapered to the second major axis of the doped rectangular core at the output face;
wherein the doped gain medium of the rectangular core extends from the input face to the output face; and
wherein the tapered fiber is polarization maintaining;
amplifying the electromagnetic radiation from the signal laser within the fiber geometrical management system by a pump laser; and
coupling the amplified signal laser electromagnetic radiation out of the fiber geometrical management system.

20. The method for managing TEM00 pulse energy scaling of claim 19, wherein the single cladding or double cladding shell is adiabatically or linearly tapered from the input face to the output face.

21. The method for managing TEM00 pulse energy scaling of claim 19, wherein the first minor axis of the doped rectangular core at the input face ranges from about 5 µm to 40 µm and wherein the second minor axis of the doped rectangular core at the output face ranges from about 40 µm to 200 µm.

22. The method for managing TEM00 pulse energy scaling of claim 19, wherein the doped gain medium is selected from: Er, Yb, Tm, Ho, Er/Yb, Er:ZBLAN, Ho:ZBLAN and Tm:ZBLAN.

23. The method for managing TEM00 pulse energy scaling of claim 19, wherein the fiber material comprises at least one of: silica, Germanium doped silica, Fluoride doped silica, Chalcogenide, and ZBLAN.

24. The method for managing TEM00 pulse energy scaling of claim 19, wherein the tapered fiber operates in a wavelength range from about 0.7 µm to about 5.0 µm.

* * * * *